Oct. 25, 1938.   O. R. HAWKINS   2,134,608
CITRUS FRUIT OIL EXTRACTING AND GRATING APPARATUS
Filed April 28, 1938   3 Sheets-Sheet 1
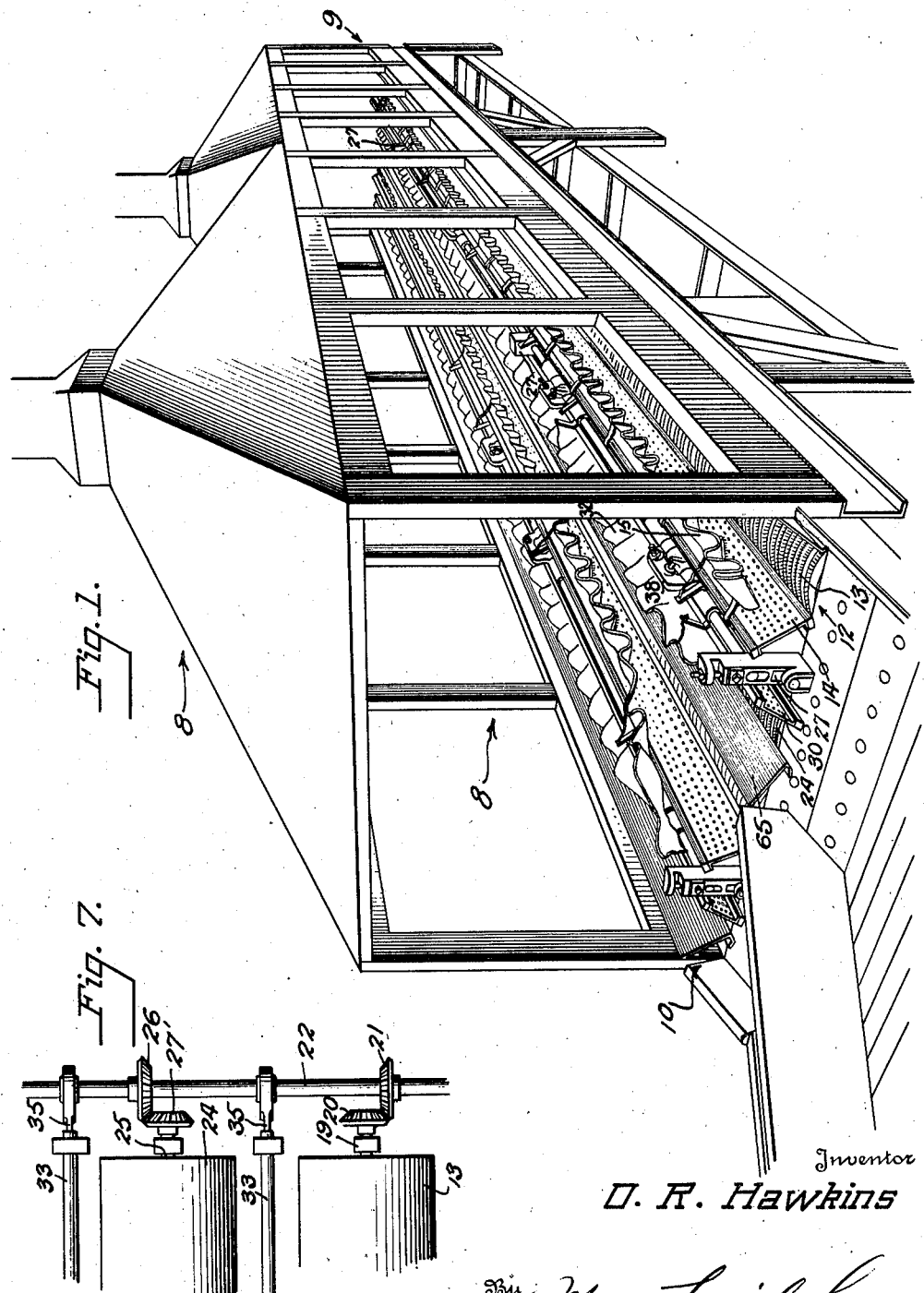
Inventor
O. R. Hawkins

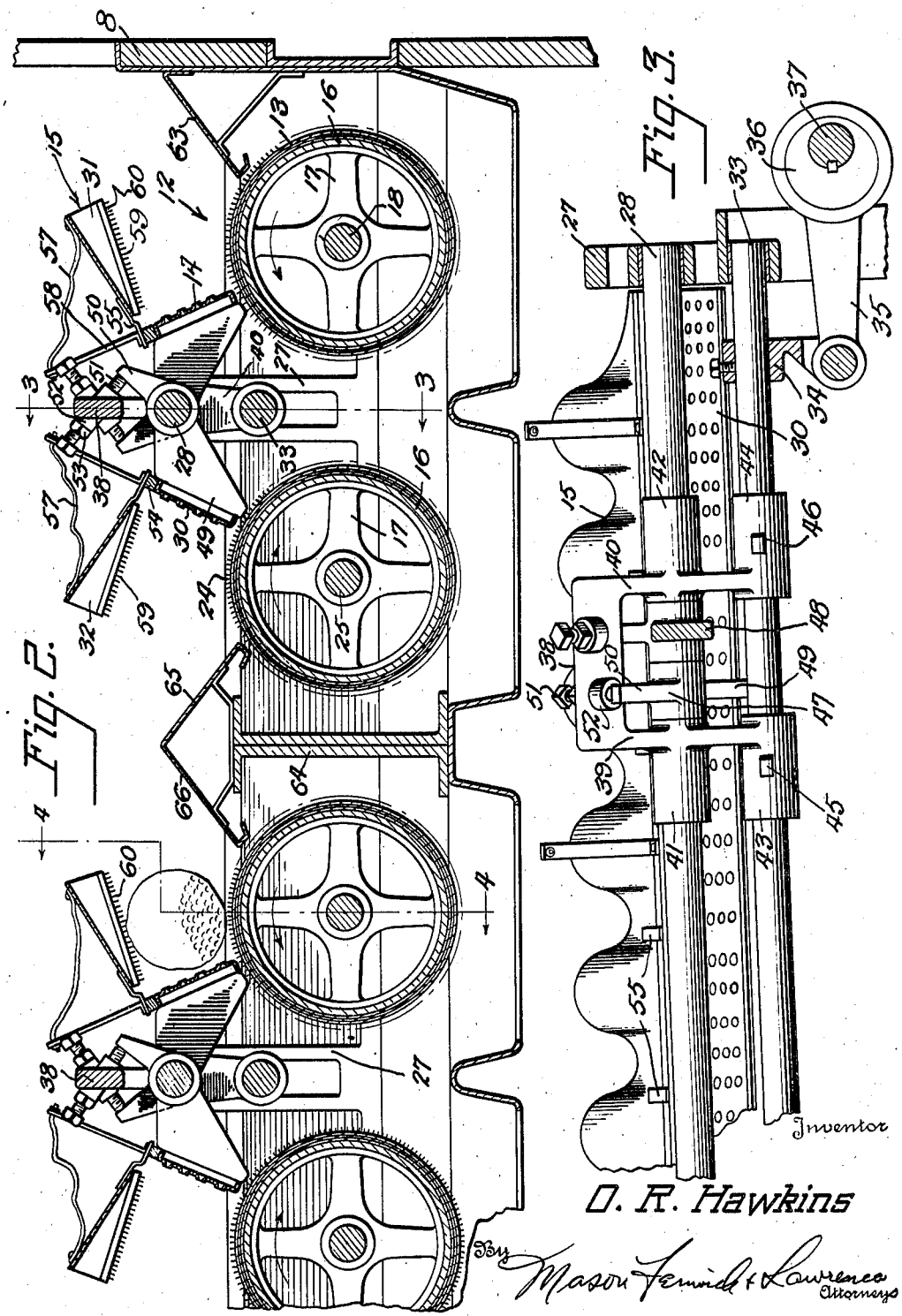

Oct. 25, 1938.　　　O. R. HAWKINS　　　2,134,608
CITRUS FRUIT OIL EXTRACTING AND GRATING APPARATUS
Filed April 28, 1938　　　3 Sheets-Sheet 3
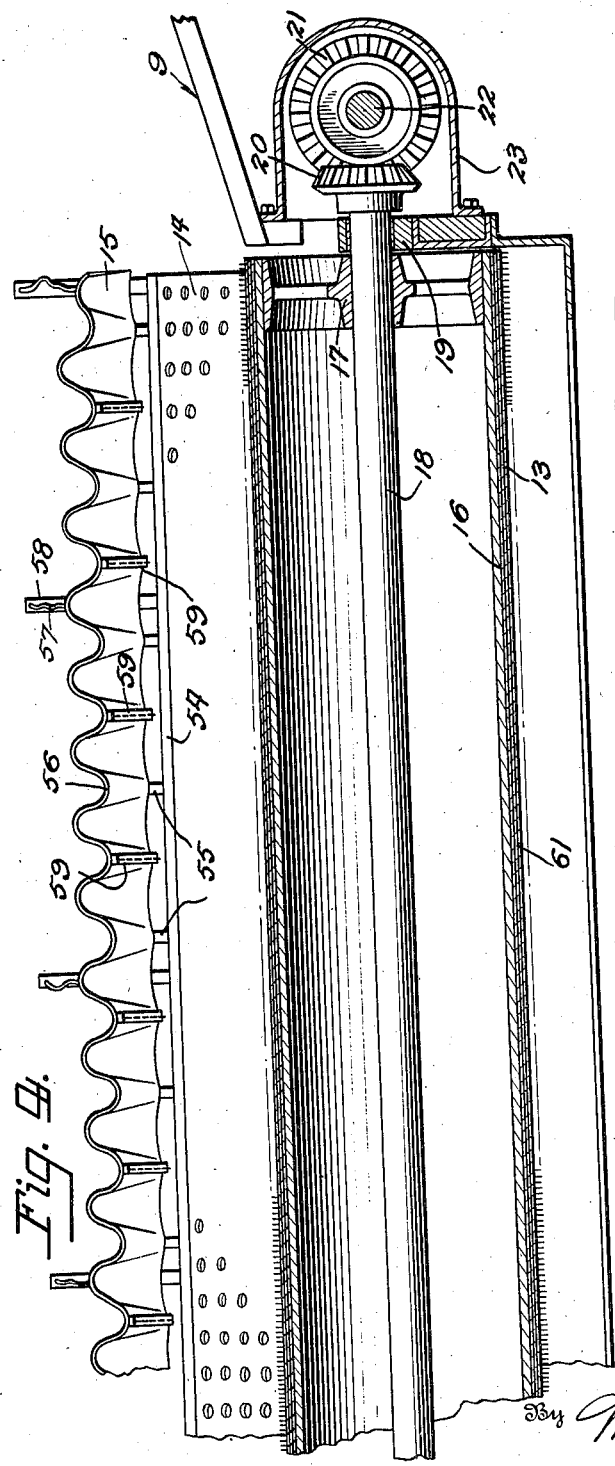
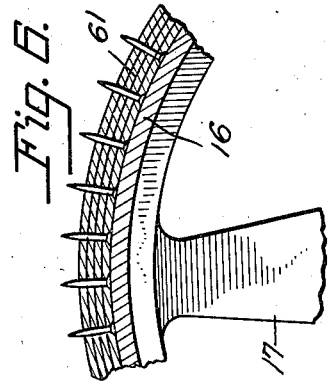
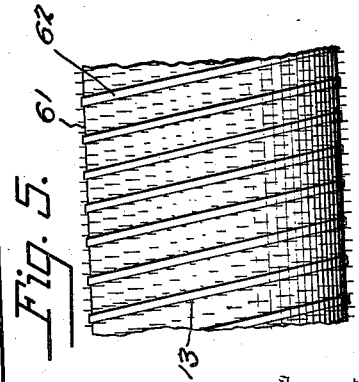
Inventor
O. R. Hawkins
By Mason Fenwick & Lawrence
Attorneys Patented Oct. 25, 1938

2,134,608

UNITED STATES PATENT OFFICE 2,134,608

CITRUS FRUIT OIL EXTRACTING AND GRATING APPARATUS

Orville R. Hawkins, Lake Alfred, Fla., assignor to Floridagold Citrus Corporation, Lake Alfred, Fla.

Application April 28, 1938, Serial No. 204,897

7 Claims. (Cl. 146—3)

The invention forming the subject matter of this application relates to apparatus for extracting oil from the skins of citrus fruit and for grating the skins.

The main object of the invention is to remove the greater part of the outer skins, or that portion of skin containing the oil cells, of citrus fruits such as grapefruit, oranges, etc., for the purpose of preparing the fruit itself for subjection to any of the well known processes for squeezing or extracting juice therefrom, and eliminating the oils and other matter which ordinarily give the extracted juices an undesirable taste.

Another object of the invention is to provide apparatus by which this extraction of oil can be carried out automatically and cheaply, and which in the process of oil extraction provides gratings of the skins adapted for use by bakers and candy manufacturers as flavorings.

Other objects of the invention will become apparent as the detailed description thereof proceeds.

In the drawings:

Figure 1 is a perspective view of apparatus involving the present invention;

Figure 2 is a transverse section of the apparatus shown in Figure 1;

Figure 3 is a fragmentary vertical section taken on the line 3—3 of Figure 2;

Figure 4 is a section taken on the line 4—4 of Figure 2;

Figure 5 is a fragmentary elevation of a grating drum forming part of the invention;

Figure 6 is a fragmentary section to a greatly enlarged scale of one of the grating drums employed in this apparatus; and Figure 7 is a fragmentary plan view of certain elements of the mechanism for driving the various grating elements of the machine.

Referring to the drawings, in which similar parts are designated by like numerals:

The grating and oil extracting apparatus comprises a framework designated generally by the reference numeral 8. In actual use this apparatus is preceded by a washing apparatus, (not shown), which feeds the washed citrus fruit into the grating troughs which extend in a downwardly inclined direction from the inlet end 9 to the outlet end 10 of the framework 8. At the outlet end the citrus fruit from which substantially all the outer skins have been removed by grating, are fed onto a conveyor 11 which conducts the prepared fruit to a juicer in which the fruits may be cut in half and the juice pressed therefrom in the usual manner. By this procedure, the juice is extracted from the fruit and the essential oils of the skins are prevented from mingling with the juice to detract from the natural taste thereof.

As shown particularly in Figures 1 and 2 of the drawings, there are four troughs or runways along which the citrus fruit is fed for the purpose of extracting the essential oils of the skin from the fruit; and, as an incidental feature, the removal of the skins or the greater part thereof in the form of gratings which can be used by bakers and candy manufacturers for the purpose of imparting flavorings to their products. Since the oil extracting and grating operations are the same for each trough, the structure involved in the extracting and grating operation along one of the troughs only will be described in detail, with the understanding that the same description will apply to the structures involved in the operation of the other parallel troughs.

The first trough at the right-hand side of Figures 1 and 2, and designated generally by the reference numeral 12, is formed by a drum 13 of comparatively large diameter, a grating board 14 and a ruffle sheet 15. The drum 13 (see Figures 4 and 6) comprises a cylinder 16 constructed of any suitable material and suitably secured at its opposite ends to spiders 17, which in turn are secured to the shaft 18 mounted for rotation on suitable bearings 19 forming part of the framework at the opposite ends thereof. The shaft 18 has a beveled gear 20 fixed to its outer end in mesh with a beveled gear 21 which is suitably secured on a drive shaft 22, the said drive shaft and connected gearing being enclosed in a casing 23 detachably secured to the framework. It will be understood that the opposite end of the shaft 18 will be mounted in a similar bearing but with the beveled gearing omitted.

The drum 24 next to the drum 13 is similarly mounted on a shaft 25 for rotation in the opposite direction to the drum 13; and the drive shaft 22 is provided with a beveled gear 26 meshing with a beveled gear 27 secured to the end of the shaft 25 for the purpose of imparting rotation thereto. The arrangement of gearing to effect rotation of the adjacent drum in opposite direction is shown in Figure 7 of the drawings and will be obvious without further description to persons skilled in the art.

Standards 27 forming part of the supporting framework 8, are spaced apart lengthwise of the framework and between the adjacent drums 13 and 24. A guide rod 28 is fixed in these standards to form a support for the reciprocable graters 14 and 30, and the flexible ruffle sheets 31 and 32. A second rod 33 is slidably mounted in the standards 27 directly below and parallel to the guide rod 28.

The rod 33 is reciprocated in its standards 27 by means of the collar 34 clamped to rod 23, and pivotally connected to one end of link 35, the other end of which is shaped to receive the eccentric 36 keyed for rotation to the shaft 37. Between each pair of standards 27, and slidably mounted on the rods 28 and 33, is a casting 38 shaped as a yoke having the legs 39 and 40 provided with aligned collars 41—42 and 43—44, which constitute the means for slidably supporting the yoke on the framework.

The lower collars 43 and 44 are fixed to the reciprocating rod 33 by means of the set-bolts 45 and 46, while the collars 41 and 42 slide freely on the guide rod 28. Bell crank levers 47 and 48 are pivoted at their elbows between the legs 39 and 40 to rock about and slide on the guide rod 28. One arm 49 of the bell crank 47 extends over the drum 24 to form a support for the grater 30. The other arm 50 of the bell crank 47 extends on the opposite sides of the casting 38 and is located to contact with the end of an adjusting screw 51 screwthreaded into an internally screwthreaded boss 52 forming part of the casting 38. A lock nut 53 serves to secure the adjusting screw 51 in any position of desired adjustment. It will be obvious from inspection of Figure 2 of the drawings that adjustment of the screw 51 will move the arm 49 so as to adjust the grater 30 into any desired angular position with respect to the drum 24. The bell crank 48 is provided with a similar arrangement for adjusting the position of the grater 29 with respect to the drum 13.

As already described any desired number of these reciprocating castings may be arranged between the standards 27. Obviously the number of standards and reciprocating castings will vary with the lengths of the machines. The drums must obviously be rotated toward their graters in order that the spikes or needles on the drum may perform their function of puncturing the skins of the citrus fruit and compelling this fruit to contact with the graters during their movements from the inlet to the outlet end of the apparatus.

To maintain the fruit in contact with the rotating drum 14, the upper edge of the latter is provided with a strip 54 connected by a series of straps 55 to the inner edge of a sheet 56 of material gathered to form ruffles. The outer edge of the sheet 56 is connected by flexible straps 57 to a series of supporting brackets 58 which are suitably secured at their lower ends to the strip 54. Preferably the lower parts of alternate ruffles have suitably secured thereto the strips 59 of belting through which project a plurality of spikes or needles 60.

The periphery of the drum 13 is spirally wrapped with similarly spiked belting 61 fixed to said periphery by means of a similarly wound stainless steel strap 62. A guard plate 63 is suitably secured to the framework of the side of the drum 13 opposite to the grater 14. Preferably these drums and the grating mechanism connected therewith are arranged in pairs separated by runners 64 supporting on their upper edges guard plates 65 and 66 performing the same function as the guard plates 65.

For the purpose of economy it is preferable to construct these grating mechanism in pairs in which the drums of each pair rotate in opposite directions. Obviously, the number of pairs of such mechanism can be multiplied indefinitely and operated by the same drive mechanism. It will be understood, of course, that all the essential elements of these multiplied mechanisms will be substantially similar to those described in detail.

In the operation of this apparatus the previously washed citrus fruit is conveyed to the inlet end of the grating apparatus, the rotation of the drums against the grating plates forces the citrus fruit against these plates and the action of the needles on the drum punctures the surfaces of the skins to release the essential oils thereof. At the same time the needles shred parts of the skin of the fruits which are held against the grating plates. The reciprocation of the grating plates causes the oranges to rotate in different directions. The ruffle sheet being flexible and being flexibly supported by the straps 57, engage the upper parts of the fruit and maintain the fruit in contact both with the rotating drum and the reciprocating grater plate. The needles 60 on the lower or trough parts of the wave-like ruffle sheet 56 engage the fruit and then impart rotation thereto in directions different to those imparted by the drums and grater plates.

It will be apparent that as the fruit travels through the machine every part of its skin surface will be shredded by the needles on the drums and that the gratings of the skins will pass through the apertures in the graters onto trays suitably supported on the framework below the rotating drums and reciprocating graters. The grated fruit is conveyed from the outlet end of the machine onto the conveyor 11 which feeds the fruit to suitable washing and juicing mechanism.

Numerous variations may doubtless be devised by those skilled in the art without departing from the principles of my invention. I, therefore, desire no limitations to be imposed on my invention, except such as are indicated in the appended claims.

What I claim is:

1. Citrus fruit grating apparatus comprising a support, an apertured grating member slidably mounted on said support, means for reciprocating said member, a spiked drum rotatable on said support with its periphery adjacent the lower edge of said grating member, means for rotating said drum toward said reciprocating member, and means for adjusting said grating member about an axis parallel to the axis of rotation of said drum, the skins of the fruit punctured and shredded by the spikes of said drum and grated by said member being discharged through the apertures of said member.

2. Citrus fruit grating apparatus comprising a support, an apertured grating member slidably mounted on said support, means for reciprocating said member, a spiked drum rotatable on said support with its periphery adjacent the lower edge of said grating member, means for rotating said drum toward said reciprocating member, means for adjusting said grating member about an axis parallel to the axis of rotation of said drum, and resilient means for maintaining citrus fruit in contact with said grating member and drum, the skins of the fruit punctured and shredded by the spikes of said drum and grated by said member being discharged through the apertures of said member.

3. Citrus fruit grating apparatus comprising a support, a spiked drum rotatable on said support, a guide rod extending along said support parallel to the axis of rotation of said drum, an apertured grating member slidably and rotatably mounted on said guide rod and having its lower edge adjacent to the periphery of said drum, means for angularly adjusting said grating member about said guide rod, means for simultaneously reciprocating said grating member on said guide rod and for rotating said drum, and means reciprocable with said grating member and extending over said drum to maintain citrus fruit in contact with said drum and grating member during the operation thereof, the skins of the fruit punctured and shredded by the spikes of said drum and grated by said member being discharged through the apertures of said member.

4. The apparatus set forth in claim 3 in which the last named means includes a sheet of flexible material secured at one of its edges to the upper edge of said grating member, said sheet being ruffled and having the troughs thereof provided with spiked members adapted to contact the citrus fruit as it moves through the machine to maintain the same in contact with said drum and grating member and to change the axes of rotation of said fruit.

5. The apparatus set forth in claim 3 in which the last named means includes a sheet of flexible material secured at one of its edges to the upper edge of said grating member, spaced apart supports extending from said upper edge, and straps connecting the upper ends of said supports to the free edge of said sheet to support the sheet extending from said grating member over said drum, said sheet being ruffled and having the troughs thereof adapted to contact with citrus fruit passing through the machine and to maintain said fruit in contact with the rotating drum and reciprocating grating member.

6. Citrus fruit grating apparatus comprising a support, an apertured grating member reciprocable rectilinearly on said support, a spiked drum rotatable with its periphery closely adjacent to one edge of said grating member, and means for simultaneously reciprocating said member and rotating said drum, the skins of the fruit punctured and shredded by the spikes of said drum and grated by said member being discharged through the apertures of said member.

7. Citrus fruit grating apparatus comprising a support, an apertured grating member reciprocable rectilinearly on said support, a spiked drum rotatable with its periphery closely adjacent to one edge of said grating member, means for simultaneously reciprocating said member and rotating said drum, and flexible means extending from the other edge of said grating member over said drum to maintain citrus fruit in contact with said member and drum during the operation thereof, the skins of the fruit punctured and shredded by the spikes of said drum and grated by said member being discharged through the apertures of said member.

ORVILLE R. HAWKINS.